July 1, 1924.

J. H. REID

PROCESS OF PRODUCING GAS

Filed Feb. 13, 1920

1,499,750

3 Sheets-Sheet 1

Inventor
James Henry Reid,
By Hull, Smith, Bock West,
Attys

July 1, 1924.

J. H. REID 1,499,750

PROCESS OF PRODUCING GAS

Filed Feb. 13, 1920  3 Sheets-Sheet 2

Inventor
James Henry Reid
By Hull, Smith, Brock & West
Attys

July 1, 1924.

J. H. REID

PROCESS OF PRODUCING GAS

Filed Feb. 13, 1920

1,499,750

3 Sheets-Sheet 3

Inventor
James Henry Reid,
By Hull, Smith, Brock & West,
Attys

Patented July 1, 1924.

1,499,750

UNITED STATES PATENT OFFICE.

JAMES HENRY REID, OF READSBORO, VERMONT, ASSIGNOR TO INTERNATIONAL NITROGEN CO., OF CLEVELAND, OHIO, A CORPORATION OF DELAWARE.

PROCESS OF PRODUCING GAS.

Application filed February 13, 1920. Serial No. 358,456.

*To all whom it may concern:*

Be it known that I, JAMES HENRY REID, a citizen of the United States, residing at Readsboro, in the county of Bennington, and State of Vermont, have invented certain new and useful Improvements in Processes of Producing Gas, of which the following is a specification.

In the manufacture of calcium carbide as generally practiced, calcium oxide, and carbon in the form of coke, are introduced into a sealed electric furnace and the mass there subjected to the action of electricity until the carbide reaction is substantially complete.

In the practice of the invention forming the subject matter of this application, the carbon and the calcium oxycompound are mingled in such proportions as will yield calcium carbide; but the materials employed and the mode of the treatment thereof are such that a large quantity of gas, suitable for various purposes in the industrial arts, is produced. Furthermore, there is secured as a residue from the production of the gas, a carbide, which is of a degree of purity of commercial value, and which may be of the highest degree of purity.

Figure 1:
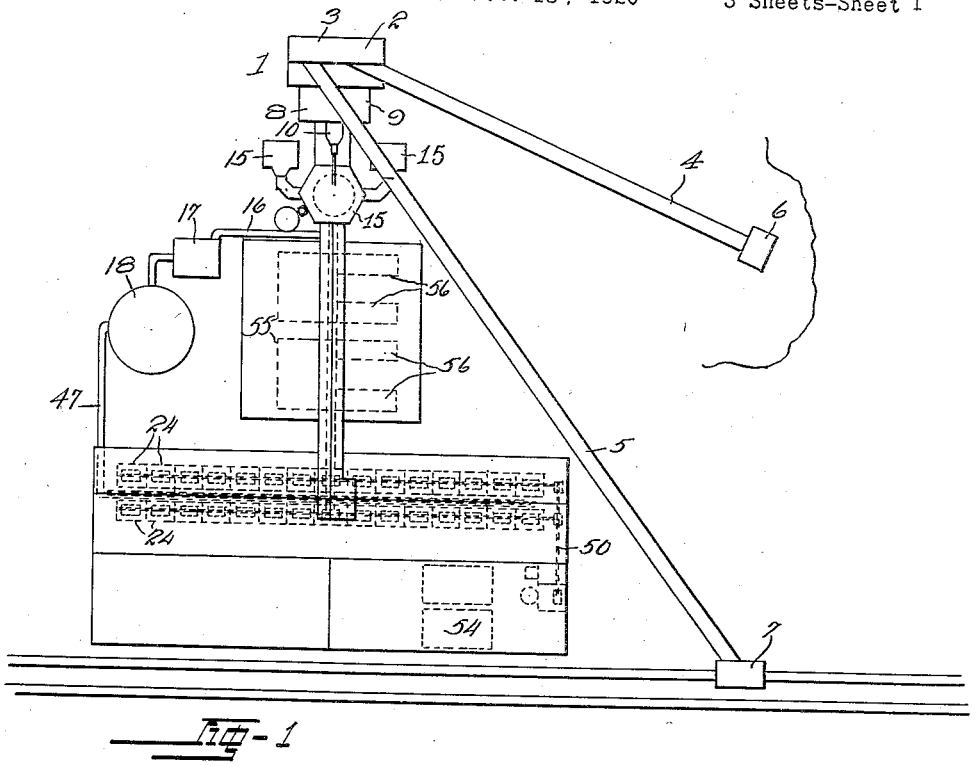
Figure 2:
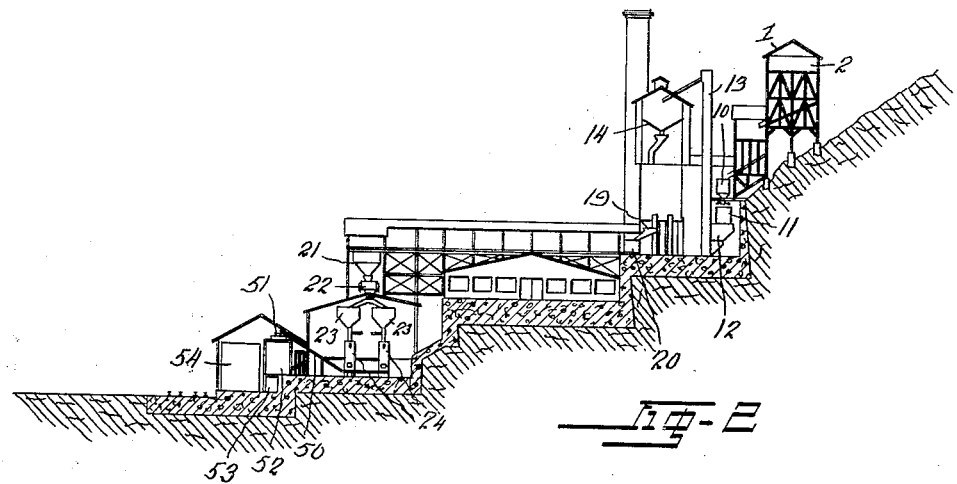
Figure 3:
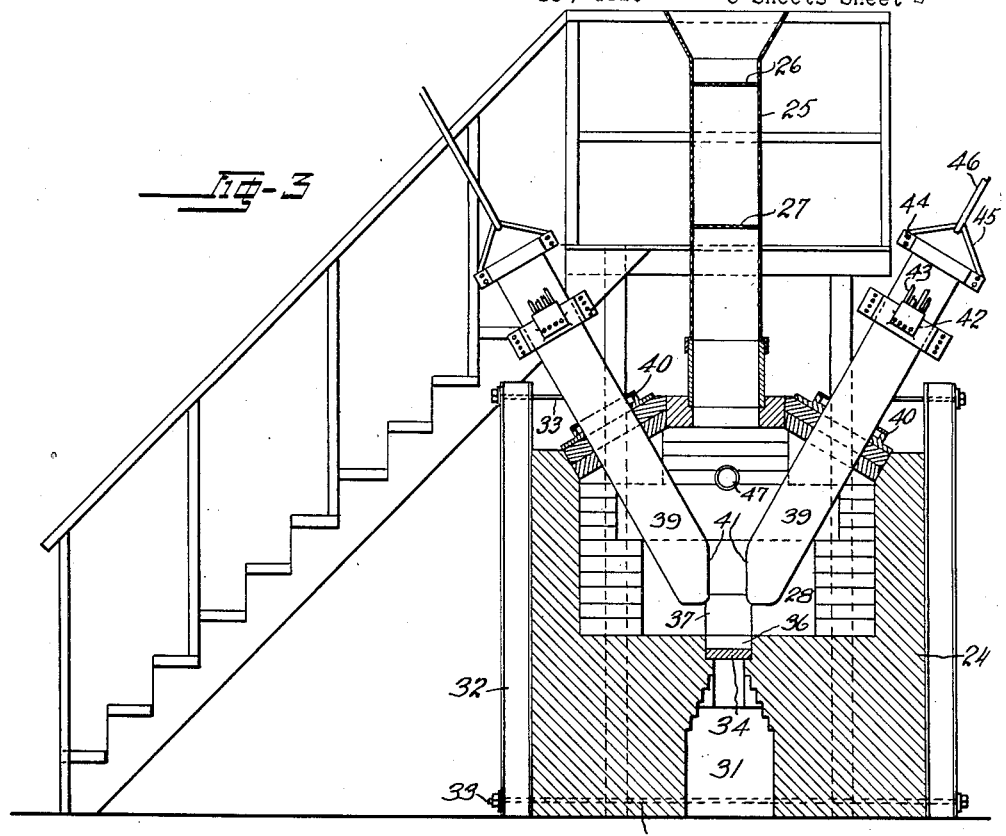
Figure 4:
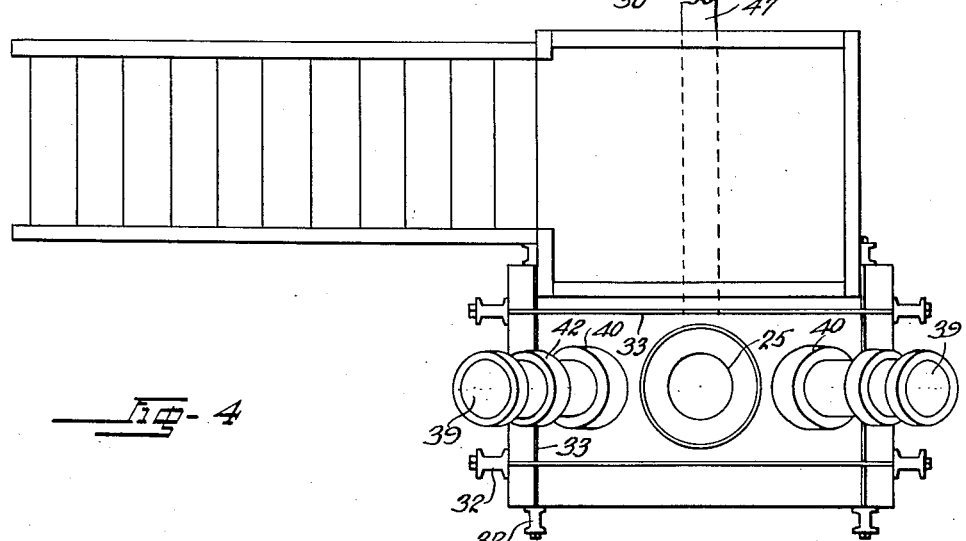
Figure 5:
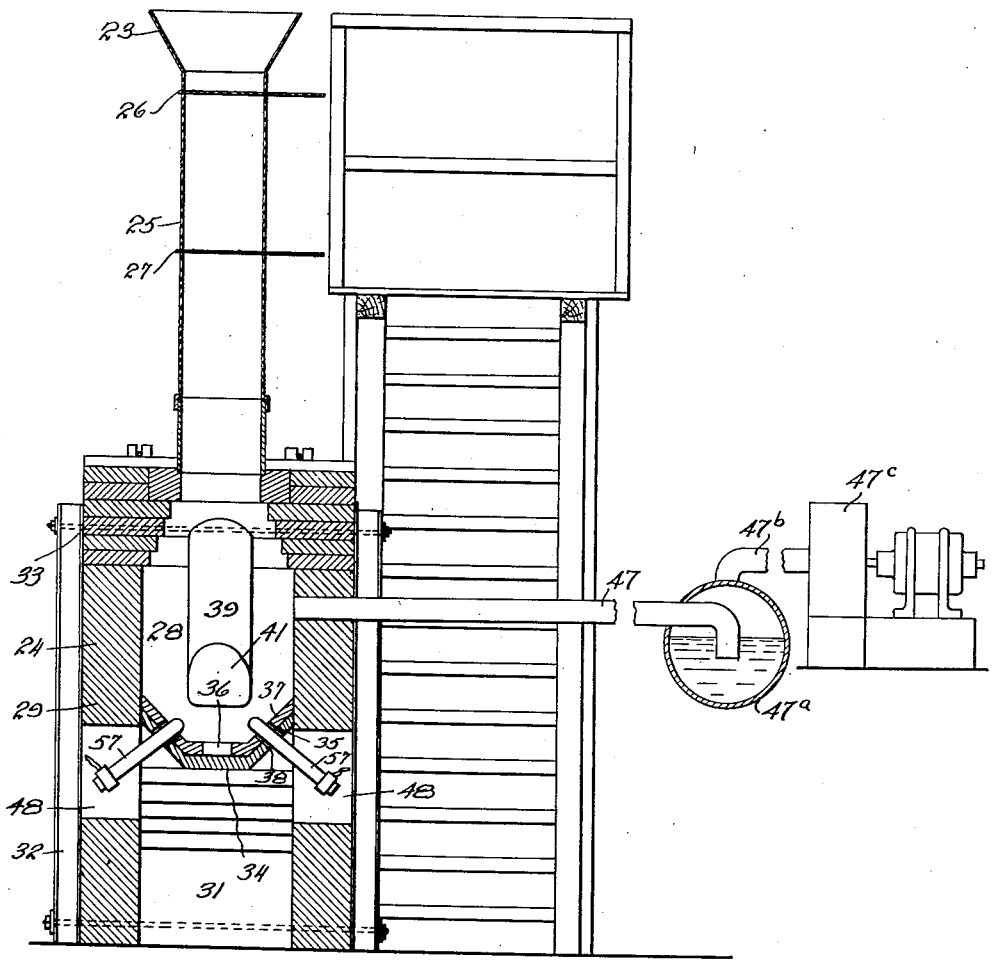

These general objects and other objects which will appear hereinafter are accomplished in and through the use of an apparatus such as shown in the drawings forming a part hereof, wherein Fig. 1 represents a diagrammatic plan view of a plant or system for realizing the process covered hereby; Fig. 2 an elevation of such plant or system; Fig. 3 a central sectional view and Fig. 4 a plan view of the carbide furnace; and Fig. 5 a sectional view of said furnace taken at right angles to Fig. 3.

Describing the parts by reference characters, 1 denotes a house containing bins or bunkers 2 and 3 for the storage of calcium carbonate in its commercial form of limestone and a coke-producing carbon compound, as bituminous coal. The carbonate and the coal may be conducted to their respective bunkers as by conveyors 4 and 5 leading respectively to the crushing house 6 of a limestone quarry and to a coal hopper 7. The coal and limestone are discharged from their respective bunkers to a hammer mill 8 and grinding ball mill or disk mill 9, respectively, from the storage bins whereof they are delivered to a weighing lorry 10 and a mixer 11 and thence into a bin 12 and by an elevating conveyor 13 to a hopper 14. From the hopper the mixture is delivered into one or more gas producer retorts 15. The retorts may be of any standard construction for the distillation of coal and are connected by a main 16 with an exhauster and condenser 17 and thence to a gas holder 18.

The coal is broken or otherwise reduced to a fineness of about eight mesh, and the carbonate to a fineness of about forty mesh, and mixed in such proportions that, after the distillation is completed, the carbon and limestone will be present in the coked mixture in such quantities as to yield calcium carbide when fused in an electric furnace. Where substantially pure carbide is desired, the limestone and coal are mixed in approximately equal proportions by weight in the mixer 11, and this mixture is heated to a temperature of from 2600° F. to 2800° F. in the retorts. By reason of the ingredients employed and the mode of treatment, all of the gases ordinarily obtained by the distillation of bituminous coal are secured; moreover, the finely divided condition of the heated mass of carbonate and carbon contributes to the cracking of the liquid tarry constituents into their constituent gases. This cracking of the tarry constituents into gases is secured by bringing the liquid tarry material into contact with a myriad of incandescent bodies or points, due to the finely divided condition of the carbon and carbonate ingredients; and, instead of securing the tar oils in a liquid condition (the universal result heretofore) the latter are recovered in the form of gases which serve to enrich the gases obtained by the ordinary distillation of bituminous coal. As the ingredients are retorted in a reducing atmosphere, the carbonate is not converted into the oxide, at least as long as hydrocarbon vapors are present.

At the end of about six to twelve hours, depending upon the degree of heat, the distillation will have been completed and the glowing residue, consisting of intimately mingled carbon and calcium carbonate, will be dumped from the retorts, entirely freed from tarry products. The mass may be discharged into a chute or hopper 19 and thence into covered cars 20 whence it may be conveyed quickly to a hopper 21 and delivered through a crusher 22 and hoppers 23 into the electrical furnaces 24, without material loss of heat. Each furnace is provided with a stack 25 extending from the bottom of the hopper thereabove and provided with vertically spaced sliding gates 26 and 27. With the temperature as given for the material in the retorts, the residue may be charged into the furnaces at a temperature as high as approximately 2000° F.

Each furnace shown herein comprises a furnace chamber 28, which is shown as rectangular in cross section, the chamber being formed within a casing 29, as of fire brick, having a thick base 30 provided with a carbide pit 31. The casing is shown as braced by upright braces 32 near each corner thereof, the opposite braces being connected by stay bolts 33.

The bottom of the furnace chamber is provided with a hearth consisting of a base, preferably of cast iron, and a carbon lining. The hearth base comprises a flat bottom 34 and inclined sides 35 extending upwardly from opposite ends of the bottom of the adjacent side walls of the casing. The carbon lining is of similar shape and comprises a bottom 36 and inclined sides 37. The hearth is narrower than the furnace chamber and is located midway between opposite sides thereof. At about one inch above the junction of each side 35, 37 with the bottom 34, 36 and preferably in the middle of the width of each side is an outlet opening 38 for discharging molten carbide into the pit 31. The purpose of elevating the outlets is to provide a free flow for carbide after the initial stage. The first carbide drops into the center of the hearth and adheres thereto. The carbide formed thereafter runs out, the original bottom layer forming a hearth lining. The hearth radiates heat to and through the material thereabove, thus facilitating the continuous delivery of the molten carbide.

Projecting into the chamber 28, and preferably diagonally downwardly, as shown, are carbon electrodes 39. Each electrode passes through a stuffing box 40, and their lower ends extend toward the middle of the bottom of the chamber, being spaced apart above the hearth. The proximate portions of the lower ends of the electrodes are preferably provided with vertical faces 41 providing a vertical passageway therebetween above the bottom of the hearth.

Surrounding each electrode outside the furnace is a bronze or copper ring 42 having on opposite sides thereof a plurality of sockets into which the cables 43 are welded. To the outer end of each electrode there is secured a ring 44 carrying a bail 45 to which a cable 46 is connected for the purpose of raising and lowering the electrodes. When the electrodes are arranged as shown, they may each be counterweighted to facilitate adjusting the same.

Each furnace is provided with a conduit 47 leading to a hydraulic main 47$^a$ which is connected by a conduit 47$^b$ and a fan 47$^c$ with the holder 18. Each furnace is also provided with openings 48 on opposite sides thereof below the tops of the inclined sides of the hearth and adapted to be closed by slabs or doors.

In each furnace the limestone-coke is heated to a temperature sufficient to fuse the same into carbide by the current supplied through the electrodes 39. Good results have been obtained with an amperage of about 2500–4000 and a voltage of 60–95. The coke and carbonate under this treatment liberate carbon monoxide and other gases, which may be delivered from the furnace by the conduit 47 to the holder 18.

Where a mixture of 4000 lbs. of limestone and 4000 lbs. of coking coal has been employed, approximately 27,000 cubic feet of gas of high heating value has been recovered from the retorts, the loss of weight due to the coking of the coal in the retorts being about 1480 lbs., leaving about 6520 lbs. of a mixture of coke and calcium carbonate. This mixture, being subjected to the action of electricity within the furnace, has been converted into calcium carbide with a liberation of nearly 90,000 cubic feet of carbon monoxide, yielding about 3000 lbs. of calcium carbide of the highest quality and making a total recovery from the original 8000 lbs. of the mixture of about 3000 lbs. of calcium carbide and about 117,000 cubic feet of extremely valuable gas. After the furnace has been heated throughout to the desired extent, substantially pure carbide will be discharged in a continuous stream from the outlets 38, the coke-limestone compound continuously replenishing by gravity that converted into gas and carbide in the lower part of the furnace.

From the pits 31, the carbide may be conducted by a conveyor 50 to a carbide grinder 51, whence the carbide is delivered into a bin 52. Where it is desired to produce nitrogen compounds, the carbide may be mixed with a suitable catalyst in a mixer 53 and this mixture nitrified in ovens 54.

A part of the gas produced from the limestone and carbon may be employed for operating gas engines 55 for the electrical generators 56 for the furnaces 24.

If, during the operation of the furnace, the carbide delivered by the electrodes 39 congeals or becomes congealed, as by sudden lowering of the voltage, I may employ electricity for the purpose of re-fusing the congealed mass. For this purpose a pair of electrodes 57 may be employed, preferably of carbon and each adapted to be inserted through and reciprocated within an opening 38. Current under an appreciably lower voltage than that supplied to the electrodes 39 will suffice to re-fuse the carbide and prevent interruption of the continuous operation of the furnace. The electrodes 57 will be sufficiently smaller than the openings 38 to permit the discharge of the carbide without the necessity for withdrawing the electrodes. By this means, a circuit may be established through the congealed mass as well as through the obstructed outlet or outlets, and the continuity of the process is thereby insured.

Where desirable, the molten carbide from the outlet openings 38 may be discharged into a large tank containing water. The action of the incandescent carbide on the water generates not only acetylene, but a large proportion of hydrogen. The gases thus produced may be delivered into the conduit 47 through the furnace chamber 28, by means of suitable connections between the tank and the said chamber. By entering the furnace chamber and coming into contact with the myriads of hot points of lime in the present of glowing carbon, a cracking or interchange of molecules is produced in the said gases, producing gases differing in the proportions of carbon and hydrogen from those so introduced. As an illustration the following equation is submitted:

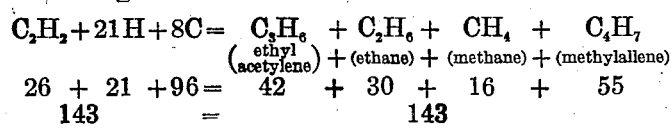

It is preferred to perform this operation in connection with a somewhat different form of furnace, and this feature of the invention will be embodied in a subsequent application.

The hydraulic main is employed for the purpose of removing the gas from the furnace under extremely light vacuum.

Among the advantages secured by the process are:—

(a) The production and recovery of a large volume of gas of high heating value.

(b) Producing from the retorts a new and valuable gas, this gas being the ordinary illuminating gas of commerce enriched and increased in volume by gases resulting from the cracking of the tarry constituents of the coal.

(c) The ability to obtain from the coked carbon limestone material three times the amount of carbon monoxide that can be obtained from coked carbon lime material and with the use of only a small excess of carbon over that employed with the latter material. This will be evident from the following reactions:

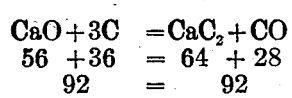

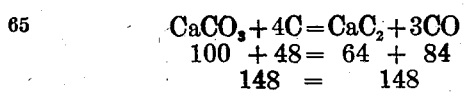

(d) Cheapness of carbide production, due to the use of cheap calcium carbonate in place of the expensive calcium oxide and the extremely intimate association of the fused mass of coke and carbonate which provides a uniform resistance to the passage of electricity and reduces the current requisite for the carbide reaction. Moreover, the limestone or carbonate acts as a fluxing agent in the electric furnace and greatly facilitates the reduction of the mixture to carbide.

(e) The process may be a continuous one, from the retorts to and including the electrical furnace. The coke-carbonate from the retorts may be introduced into the furnace in a heated condition and, in the latter, is subjected to the action of electricity which not only generates additional gas but produces a residue which is itself capable of evolving gas; and a saving in the operation of one-half of the electric current that would otherwise be required for fusing is effected.

(f) The production and recovery of gas from the fusion of a mixture of bituminous coal and calcium carbonaceous material.

Having thus described my invention, what I claim is:—

1. The process of manufacturing gas and a metallic carbide which comprises heating a mixture of a metallic carbonate and distillable cokable carbonaceous material in a retort closed to the admission of air or oxygen, thereby to produce a combustible gas and a carbon-containing residue suitable for the production of carbide, and subjecting the said residue to a temperature sufficient to produce metallic carbide and a gas containing carbon monoxide.

2. The process of manufacturing gas and a metallic carbide which comprises heating a mixture of a finely divided metallic carbonate and a coke-producing compound in a retort closed to the admission of air or oxygen, thereby to produce a combustible gas and a residue suitable for the production of carbide, and introducing the residue into a furnace and there subjecting said residue while out of substantial contact with air or oxygen to a temperature sufficient to produce a metallic carbide and a gas consisting principally of carbon monoxide.

3. The process of manufacturing combustible gas and a metallic carbide which consists in retorting a mixture of substantially equal parts by weight of a metallic carbonate and a coke-producing material without admission thereto of air or oxygen and at a temperature sufficient to distil the said material, removing the gases thus liberated, introducing the residue into an electrical furnace, and subjecting the residue to the action of electricity, thereby converting said residue into a metallic carbide and a gas consisting principally of carbon monoxide.

4. The process of producing a combustible gas and a metallic carbide which consists in retorting an intimate mixture of substantially equal parts by weight of a metallic carbonate and a coke-producing compound without admission thereto of air or oxygen and at a temperature sufficient to coke the compound, introducing the residue into an electrical furnace, and subjecting the residue while out of substantial contact with air or oxygen to the action of electricity thereby converting said residue into a metallic carbide and a gas consisting principally of carbon monoxide.

5. The process of producing gas and calcium carbide which comprises mixing substantially equal parts by weight of calcium carbonate reduced to a fineness of about 40 mesh with coking coal reduced to a fineness of about 8 mesh, heating the mixture thus produced in a retort until the coal is coked, collecting the resultant gases, introducing the residue into an electrical furnace substantially closed to the access of air or oxygen, and subjecting the said residue to the action of electricity thereby converting the residue into a metallic carbide and a gas consisting principally of carbon monoxide.

6. The process of producing gas and a metallic carbide which comprises mixing substantially equal parts by weight of a metal carbonate reduced to a fineness of about 40 mesh with a coke-producing compound, heating the mixture thus produced in a retort until the said compound is coked, introducing the said residue into a furnace substantially closed to the access of air or oxygen, and subjecting the said residue to the action of electricity thereby converting the residue into a metallic carbide and a gas consisting principally of carbon monoxide.

7. The process of producing combustible gas and a metallic carbide which comprises retorting without the admission of air or oxygen thereto a mixture of distillable cokable carbonaceous material and a compound of the metal ingredient of such carbide capable of breaking up in the retort the tarry and oily constituents of the said material into gas, thereby to produce a combustible gas and a residue capable of forming such metallic carbide, and subjecting the said residue to a temperature sufficient to produce such metallic carbide and a gas containing carbon monoxide.

8. In the process of producing gas and a metallic carbide, retorting a mixture of cokable carbonaceous material with a compound of the metal ingredient of such carbide, the ingredients being mixed in proportions to produce a coked aggregate having therein a compound of the metal sufficient in quantity to enable the metal ingredient to combine with substantially all of the coke ingredient of the aggregate to produce carbide therewith, and the retorting operation being conducted without admission of air or oxygen to the ingredients being retorted.

9. In the process of producing gas and a metallic carbide, retorting a mixture of cokable carbonaceous material with a carbonate of the metallic ingredient of the carbide, the ingredients being mixed in proportions to produce a coked aggregate having therein a carbonate of the metal sufficient in quantity to enable the metal ingredient to combine with substantially all of the coke ingredient of the aggregate to produce carbide therewith, and the retorting operation being conducted without admission of air or oxygen to the ingredients being retorted.

10. In the process of producing gas and a metallic carbide, mixing substantially equal parts by weight of a finely divided metal oxycompound and a coke-producing compound and heating the said mixture in a retort closed to the admission of air or oxygen thereto thereby to coke the said compound.

11. The process of producing gas which consists in mixing substantially equal parts by weight of a calcium oxycompound reduced to a fineness of about 40 mesh with coking coal reduced to a fineness of about 8 mesh and heating the mixture in a retort thereby to distil the coal and produce a coked mixture of the calcium oxy-compound and carbon.

12. The process of manufacturing gas and carbide which consists in introducing into an electrical furnace a mixture of a metal carbonate with carbon, the carbonate being present in quantity to enable its metal ingredient to combine with substantially all of the carbon to produce a carbide therewith, and subjecting the said mixture while out of substantial contact with air or oxygen to the action of electricity thereby converting it into a metal carbide and a gas consisting principally of carbon monoxide.

13. The process of manufacturing gas and carbide which consists in subjecting a mixture of a metal carbonate and carbon while out of substantial contact with air or oxygen to a temperature sufficient to convert the mixture into a metal carbide and a gas consisting principally of carbon monoxide, the carbonate being present in the mixture in quantity sufficient to enable its metal ingredient to combine with substantially all of the carbon to produce carbide therewith.

14. The process of producing a metal carbide which consists in introducing into an electrical furnace a mixture of calcium carbonate and coke and subjecting said mixture while out of substantial contact with air or oxygen to the action of electricity thereby to raise its temperature to a point necessary to convert it into carbide, the carbonate being present in the mixture in quantity sufficient to enable its metal ingredient to combine with substantially all of the carbon to produce carbide therewith.

15. The process of producing a metal carbide which comprises retorting an intimate mixture of an oxy-compound of such metal and cokable carbonaceous material, thereby to produce a coked aggregate of such compound and coke, and subjecting the residue to the action of heat sufficient to secure the carbide reaction.

16. The process of producing a metallic carbide which comprises retorting with the substantial exclusion of air or oxygen a mixture of a finely divided compound of such metal and distillable cokable carbonaceous material, thereby to produce a coked aggregate of such compound and coke, and subjecting the residue from such retort to the action of electricity thereby to reduce the said aggregate to such carbide.

In testimony whereof, I hereby affix my signature in presence of two witnesses.

JAMES HENRY REID.

Witnesses:
 ISAAC VANDEN BROCK,
 ARTHUR M. McGINNESS.